US009225968B2

(12) United States Patent
Abe

(10) Patent No.: US 9,225,968 B2
(45) Date of Patent: Dec. 29, 2015

(54) IMAGE PRODUCING APPARATUS, SYSTEM AND METHOD FOR PRODUCING PLANAR AND STEREOSCOPIC IMAGES

(75) Inventor: Goro Abe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 297 days.

(21) Appl. No.: 13/461,289

(22) Filed: May 1, 2012

(65) Prior Publication Data

US 2012/0280985 A1 Nov. 8, 2012

(30) Foreign Application Priority Data

May 2, 2011 (JP) ................................. 2011-103214

(51) Int. Cl.
*H04N 13/02* (2006.01)
*H04N 13/04* (2006.01)

(52) U.S. Cl.
CPC ........ *H04N 13/0275* (2013.01); *A63F 2300/30* (2013.01); *H04N 13/0404* (2013.01); *H04N 13/0409* (2013.01); *H04N 13/0452* (2013.01)

(58) Field of Classification Search
CPC ............ H04N 13/0029; H04N 13/011; H04N 13/0044
USPC ....................................................... 345/419
See application file for complete search history.

(56) References Cited

U.S. PATENT DOCUMENTS

| | | | | |
|---|---|---|---|---|
| 3,959,580 | A * | 5/1976 | Chocol et al. | 348/42 |
| 7,493,037 | B2 * | 2/2009 | Inaba | 396/324 |
| 2004/0066555 | A1 * | 4/2004 | Nomura | 359/462 |
| 2005/0089212 | A1 | 4/2005 | Mashitani et al. | |
| 2008/0113812 | A1 | 5/2008 | Kwon | |
| 2008/0309660 | A1 | 12/2008 | Bertolami et al. | |
| 2009/0118008 | A1 | 5/2009 | Kobayashi et al. | |

(Continued)

FOREIGN PATENT DOCUMENTS

JP 2003-109025 4/2003
JP 2003107603 4/2003

(Continued)

OTHER PUBLICATIONS

Search Report mailed Aug. 29, 2014 in counterpart European Patent Application No. 12166152.4.
"How to take in-game 3D Stereo screenshots in JPS format—3D Vision Blog," Jun. 20, 2009, retrieved from the Internet Aug. 12, 2014: URL:http://3dvision-blog.com/83-how-to-take-in-game-3d-stereo-screenshots-in-jps-format/.

(Continued)

*Primary Examiner* — Stephen R Koziol
*Assistant Examiner* — Shivang Patel
(74) *Attorney, Agent, or Firm* — Nixon & Vanderhye, P.C.

(57) ABSTRACT

An image producing program executed by a computer of an image producing apparatus producing images to be displayed on a planar-view display apparatus, causes the computer to function as: first image producing means producing a planar view image of a virtual space by a reference virtual camera for providing planar view of the virtual space; display control means displaying the planar view image on the display apparatus; second image producing means for, while the planar view image is displayed on the display apparatus, setting a stereoscopic view virtual camera based on setting of the reference virtual camera and taking an image of the virtual space with the stereoscopic view virtual camera, thereby producing a stereoscopic view image including a right eye image and a left eye image obtained based on at least two viewpoints; and stereoscopic view image storage control means storing the stereoscopic view image in a storage apparatus.

19 Claims, 7 Drawing Sheets

(56) References Cited

U.S. PATENT DOCUMENTS

2010/0023878 A1\*  1/2010  Douris et al. ................ 715/757
2011/0102425 A1\*  5/2011  Ohta ............................. 345/419
2012/0223227 A1\*  9/2012  Chen et al. ................... 250/307

FOREIGN PATENT DOCUMENTS

JP          2003-284093           10/2003
JP          2008-532687            8/2008
JP          2009-112550            5/2009

OTHER PUBLICATIONS

How to stop auto screenshots?—Dragon Age: Origins Message Board for PC—Game FAQs, Apr. 4, 2011, retrieved from the Internet Aug. 13, 2014: URL:http://www.gamefaqs.com/boards/920668-dragon-age-origins/58697167.

English-language machine translation of JP 2003107603.

\* cited by examiner

IMAGE PRODUCING APPARATUS, SYSTEM AND METHOD FOR PRODUCING PLANAR AND STEREOSCOPIC IMAGES

CROSS REFERENCE TO RELATED APPLICATION

The disclosure of Japanese Patent Application No. 2011-103214, filed on May 2, 2011, is incorporated herein by reference.

BACKGROUND AND SUMMARY

The matter disclosed herein relates to an image producing apparatus, an image producing system, a computer-readable storage medium having stored thereon an image producing program which is executed on the image producing apparatus or the image producing system, and an image producing method. Specifically, the matter disclosed herein relates to an image producing apparatus, an image producing system, a computer-readable storage medium having stored thereon an image producing program which is executed on the image producing apparatus or the image producing system, and an image producing method, which are relevant to technology for providing a stereoscopic view function.

Conventionally, when a video game being executed is displayed on a display screen, the entirety or a part of the displayed image is acquired as a screenshot, and the screenshot is used as a record of a user's game play or for communications between users.

When a screenshot is acquired by the above technology during a game and is then reproduced, the reproduced image is displayed in the same planar visible manner as that of the screenshot acquired. That is, if the acquired screenshot is reproduced, a user merely views the same image as that displayed during the game once. Therefore, even if a user has acquired a screenshot, the screenshot is not much interesting to the user. In addition, the conventional technology does not have a motivation for transferring a taken screenshot to another apparatus having a different display manner.

An exemplary object of the technology disclosed herein is to provide an image producing apparatus capable of producing a screenshot having an increased interest.

The technology for achieving the above feature can be provided in the following aspects, as an example. The following specific description is in all aspects illustrative for the understanding of the extent of the technology disclosed herein, and is not intended to be limited thereto. That is, it should be understood that, from the specific description, a person skilled in the art can implement the technology in the equivalent range based on the description of the technology and on the common technological knowledge.

In one aspect, the disclosure provides a computer-readable storage medium having stored thereon an image producing program which is executed by a computer of an image producing apparatus which produces an image to be displayed on a display apparatus for planar view. The image producing program causes the computer to function as: a first image producing section; a display control section; a second image producing section; and a stereoscopic view image storage control section.

The first image producing section produces a planar view image by taking an image of a virtual space with a reference virtual camera for providing planar view of the virtual space. The display control section displays the planar view image on the display apparatus. The second image producing section, while the planar view image is displayed on the display apparatus, sets a stereoscopic view virtual camera on the basis of a setting of the reference virtual camera and takes an image of the virtual space with the stereoscopic view virtual camera, thereby producing a stereoscopic view image that includes an image for right eye and an image for left eye which are obtained based on at least two viewpoints. The stereoscopic view image storage control section stores the stereoscopic view image in a storage apparatus without outputting the stereoscopic view image to the display apparatus.

In one embodiment, the stereoscopic view image storage section may store the stereoscopic view image in the storage apparatus while the planar view image is displayed on the display apparatus, without outputting the stereoscopic view image to the display apparatus.

In the above embodiment, the second image producing section may produce the stereoscopic view image such that the image of the virtual space taken with the stereoscopic view virtual camera includes a predetermined area of the image of the virtual space taken by the first image producing section.

In the above embodiment, the second image producing section may set a right virtual camera and a left virtual camera as the stereoscopic view virtual camera for producing the image for right eye and the image for left eye, such that a view volume of the left virtual camera and a view volume of the right virtual camera each include a predetermined area in a view volume of the reference virtual camera, and may take an image of the virtual space with the set left virtual camera and the set right virtual camera, thereby producing the image for right eye and the image for left eye.

In another embodiment, the second image producing section may set a right virtual camera and a left virtual camera as the stereoscopic view virtual camera for producing the image for right eye and the image for left eye, such that the left virtual camera and the right virtual camera are each directed in the same visual line direction as the reference virtual camera, and translated, on a virtual plane containing the visual line, so as to have a positional relationship in which the reference virtual camera is positioned between the left virtual camera and the right virtual camera, and may take an image of the virtual space with the set left virtual camera and the set right virtual camera, thereby producing the image for right eye and the image for left eye.

In still another embodiment, the second image producing section may set a right virtual camera and a left virtual camera as the stereoscopic view virtual camera for producing the image for right eye and the image for left eye, such that the interval between the left virtual camera and the right virtual camera is adjusted in accordance with the position, in the imaging direction of the reference virtual camera, of a predetermined object included in the imaging range of the reference virtual camera, and may take an image of the virtual space with the set left virtual camera and the set right virtual camera, thereby producing the image for right eye and the image for left eye.

In the above embodiment, the second image producing section sets the stereoscopic view virtual camera such that the farther the predetermined object is from the stereoscopic view virtual camera, the smaller the interval between the left virtual camera and the right virtual camera is.

In various embodiments, the image producing program may further cause the computer to function as: an operation detection section configured to detect a user's predetermined operation, and the second image producing section may produce the stereoscopic view image in accordance with the detection of the user's predetermined operation by the operation detection section.

In various embodiments, the image producing program may further cause the computer to function as: a condition determination section configured to determine whether or not a setting used for the first image producing section to produce the planar view image satisfies a predetermined condition, and the second image producing section may automatically produce the stereoscopic view image if the condition determination section has determined that the setting satisfies the predetermined condition.

In various embodiments, the storage apparatus may be provided as a storage medium detachable from the image producing apparatus.

In various embodiments, the storage apparatus may be provided as a volatile storage medium included in or connected to the image producing apparatus.

In another embodiment, the above image producing program may be provided as an apparatus for realizing a function provided by the image producing program, or a system that includes one or a plurality of apparatuses connected to each other in a communicable manner. In addition, the technology disclosed herein includes an image producing method implemented in the computer-readable storage medium having stored thereon the image producing program, the apparatus, or the system as described above.

(Terms Particularly Used Herein)

In addition, as used herein, a "computer-readable storage medium" refers to any apparatus or medium capable of storing a program, a code, and/or data to be used in a computer system. The computer-readable storage medium may be any one of a volatile device and a nonvolatile device as long as it can be read by a computer system. Examples of computer-readable storage media include a magnetic tape, a hard disc drive (HDD), a compact disc (CD), a digital versatile disc (DVD), a Blu-ray (registered trademark) disc (BD), a semiconductor memory, but the exemplary embodiments are not limited thereto.

In addition, as used herein, a "system" (for example, a game system or an information processing system) may include one apparatus, or may include a plurality of apparatuses each of which can communicate with another one of the apparatuses.

As used herein, a state where an apparatus or system is "connected" to another apparatus or system is not limited to a state of being connected by a line, and can include a state of being wirelessly connected.

As used herein, the "stereoscopic view" is one function of human binocular vision. Specifically, the "stereoscopic view" refers to a function of obtaining a sense of depth from a difference between retinal images of both eyes.

As used herein, the "stereoscopic view image" refers to an image or image group that has a characteristic of being perceived as a stereoscopically visible image with a sense of depth by an observer in a state where the image is visibly provided (e.g., the image has a characteristic of reflecting a binocular disparity). For example, the "stereoscopic view image" refers to an image that provides a sense of depth to an observer when the observer views the image from a specific direction. When exemplified, the "stereoscopic view image" can be represented as a collection of density values provided to points in a space that is defined by three coordinate axes that are two free space coordinate axes and one spatial axis which corresponds to the specific direction.

Specifically, the stereoscopic view image includes at least one pair of a portion (an image for a right eye) to be viewed by the right eye of an observer of the image and a portion (an image for a left eye) to be viewed by the left eye of the observer of the image. Typically, the stereoscopic view image can be provided in a predetermined format including images (multi-view images) taken from a plurality of viewpoints. As a format for providing a stereoscopic view image, an image for a left eye and an image for a right eye may be stored as an image (one file) including these images arranged side by side. In addition, the stereoscopic view image may be provided in a predetermined format in which additional information is provided as necessary to information corresponding to these individual images. For example, examples of a format for providing a stereoscopic view image include, but are not limited to, a multi-picture format (MPO format).

It should be noted that the stereoscopic view image may be composed of an image or image group having a structure in which a portion serving as an image for a left eye and a portion serving as an image for a right eye are divided and rearranged as appropriate according to the properties of a display device to be used. For example, the stereoscopic view image may be provided in a form where an image for a left eye and an image for a right eye that are produced as separate images are divided into aligned rectangle-shaped images each having one line of pixels in the vertical direction.

As described above, the stereoscopic view image can be in any form as long as the stereoscopic view image has a function to provide a characteristic of being perceived as a stereoscopically visible image with a sense of depth by an observer.

When the individual images constituting the stereoscopic view image are provided as still image data, the still image data can be provided in any digital image format. Examples of major file formats capable of handling still images include, but are not limited to, JPEG (Joint Photographic Experts Group), GIF (Graphics Interchange Format), BMP (Bitmap), and TIFF (Tagged Image File Format).

As used herein, the "stereoscopic display" refers to a device that displays a video image that is stereoscopically viewed by an observer or a video image (image) from which an observer obtains a sense of depth. Specifically, examples of the stereoscopic display include an autostereoscopic display and an eyeglasses type stereoscopic display. Examples of the autostereoscopic display include, but are not limited to, a parallax barrier type stereoscopic display device and a lenticular lens type display device.

As used herein, the "planar view" is a visual function that is not based on stereoscopic view.

As used herein, the "display device" for "planar view" refers to a display device that does not have a stereoscopic display function, or a display device that is in a state where a stereoscopic display function is selectively inactivated.

By employing the above configuration, it becomes possible to provide an image producing apparatus capable of producing a screenshot having an increased interest, for example.

These and other objects, features, aspects and advantages of the matter disclosed herein will become more apparent from the following detailed description when taken in conjunction with the accompanying drawings.

DETAILED DESCRIPTION OF NON-LIMITING EXAMPLE EMBODIMENTS (Configuration of Image Producing Apparatus)

In an exemplary embodiment, the technology disclosed herein provides a computer-readable storage medium having stored thereon an image producing program which is executed by a computer of an image producing apparatus which produces an image to be displayed on a display apparatus for planar view. In the present embodiment, the image producing apparatus is provided as a game apparatus 3, for example.

Figure 1:
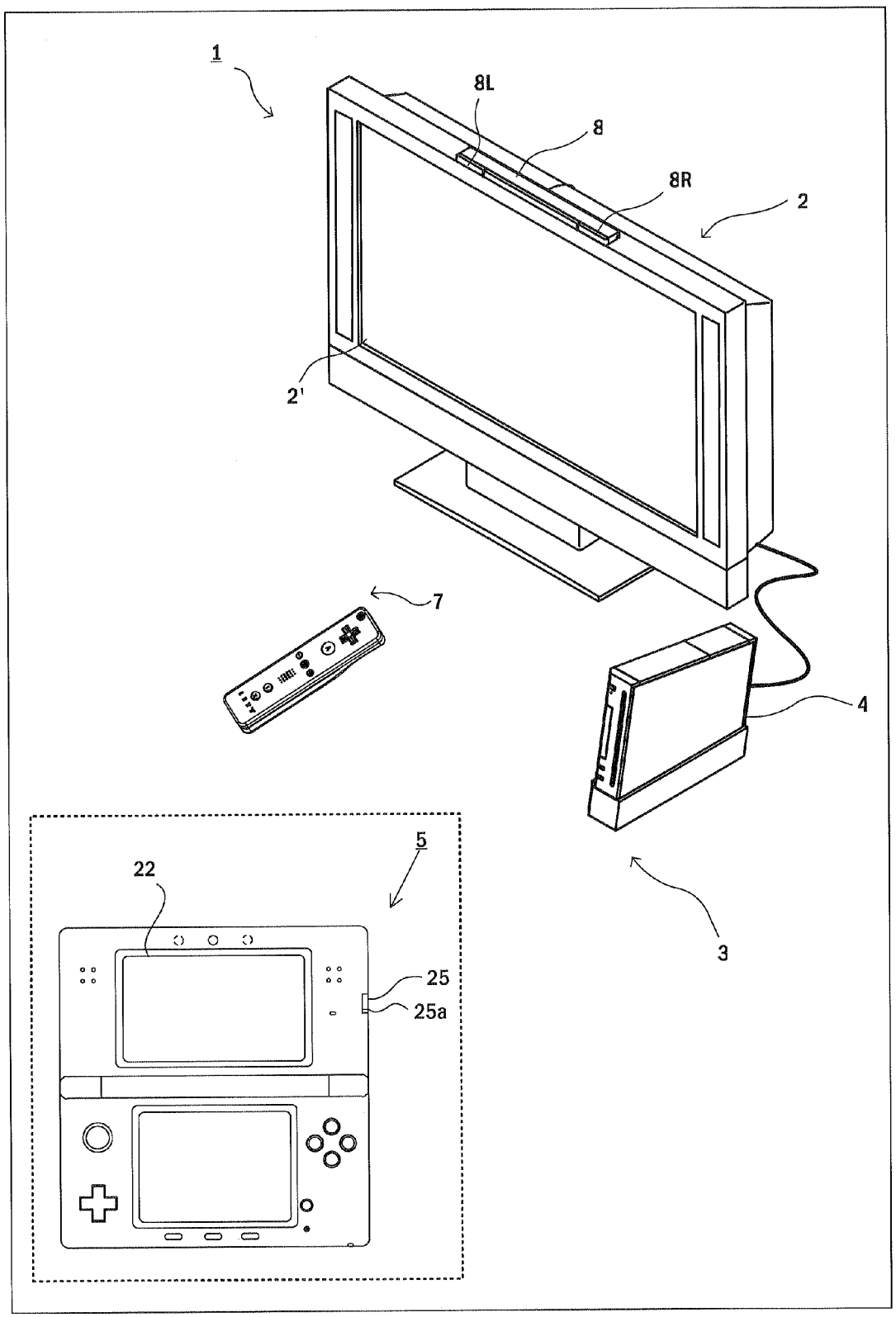
FIG. 1 is an external view of a game system 1 according to an exemplary embodiment.

With reference to FIG. 1, an image producing system that includes the game apparatus 3 will be described. Hereinafter, in order to give a specific description, a description will be given using, as the image producing system, a game system 1 including a stationary game apparatus body 4.

Figure 2:
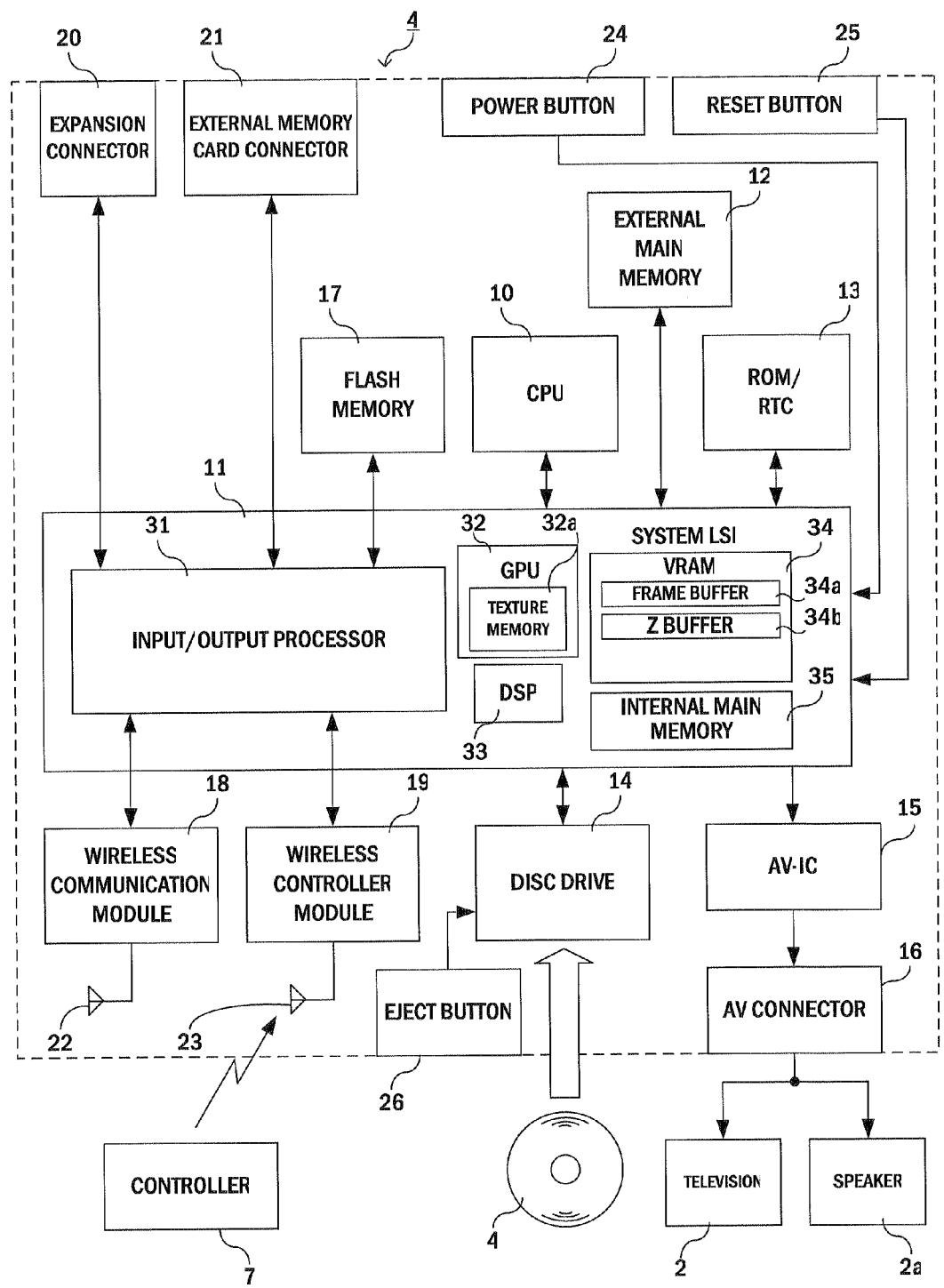
FIG. 2 is a block diagram showing an example of a game apparatus body 4 shown in FIG. 1.

FIG. 1 is an external view showing an example of the game system 1 including a stationary game apparatus 3. FIG. 2 is a block diagram showing an example of the game apparatus body 4. Hereinafter, the game system 1 will be described. It is noted that the drawings appended hereto are intended to illustrate the illustrative embodiment and not to limit the scope of the technical matter disclosed herein to the specific embodiment illustrated therein.

As shown in FIG. 1, the game system 1 includes: a home-use TV receiver 2 (hereinafter, referred to as a monitor 2) which is an example of display means; and the stationary game apparatus 3 connected to the monitor 2 via a connection cord. In the present embodiment, the monitor 2 does not have a stereoscopic display function. A user can wirelessly give an instruction to the game apparatus 3 to control the same, through operation of the controller 7.

The following will describe an internal configuration of the game apparatus body 4, with reference to FIG. 2. FIG. 2 is a block diagram showing the internal configuration of the game apparatus body 4. The game apparatus body 4 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs information processing on the basis of the programs stored in the optical disc, for example.

The CPU 10 is connected to the system LSI 11. In addition to the CPU 10, the external main memory 12, the ROM/RTC 13, the disc drive 14 and the AV-IC 15 are connected to the system LSI 11. The system LSI 11 performs processing such as: controlling data transfer among the components connected to the system LSI 11; producing an image to be displayed; obtaining data from external devices; and the like. The external main memory 12 that is a volatile memory stores programs and various data loaded from the optical disc, or various data loaded from the flash memory 17. The external main memory 12 is used as a work area or buffer area of the CPU 10. The ROM/RTC 13 has a ROM in which a boot program for the game apparatus body 4 is incorporated (so-called a boot ROM), and has a clock circuit (RTC) which counts the time. The disc drive 14 reads program data, texture data and the like from the optical disc, and writes the read data into an internal main memory 35 or into the external main memory 12.

On the system LSI 11, an input/output processor 31, a GPU (Graphic Processor Unit) 32, a DSP (Digital Signal Processor) 33, a VRAM (Video RAM) 34, and the internal main memory 35 are provided. Although not shown, these components 31 to 35 are connected to each other via an internal bus.

The GPU 32 is a part of rendering means in the game apparatus 5, and produces an image in accordance with a graphics command (image producing command) from the CPU 10. Specifically, the GPU 32 produces game image data by, according to the graphics command, performing: calculation processing required for displaying 3D graphics, such as processing of coordinate transformation from a 3D coordinate to a 2D coordinate, which is preprocessing of rendering; and final rendering processing such as texture mapping (processing of synthesizing a color of a polygon and a color of a texture per pixel and outputting a resultant color per pixel).

More specifically, describing rasterization as an example of the functions of the GPU 32, when data per vertex (per polygon) subjected to processing such as so-called perspective transformation processing is obtained, the GPU 32 calculates each side of triangles that constitute a polygon, from the vertexes of the triangles (included in the data) ("triangle setup"), and performs processing of filling the insides of the calculated triangles (processing as a DDA (Digital Differential Analyzer)). A color obtained by interpolating color information that each vertex of the triangles has, is used for filling the insides of the triangles.

Further, the GPU 32 also serves as a rasterizer to select, for each pixel where the triangle is filled, a corresponding pixel (also referred to as texel) of an image that indicates a design. For example, when data of vertexes constituting the polygon includes information of a position to be cut out from a texture image, the GPU 32 scans the texture image on the basis of the information of the position, and calculates position information of a pixel of the texture image corresponding to each pixel to be filled.

The VRAM 34 stores data (data such as polygon data, texture data, and the like) used for the GPU 32 to execute the graphics command. The VRAM 34 includes a frame buffer 34a and a Z buffer 34b.

The frame buffer 34a is, for example, a memory for rendering or storing image data, for one frame, which is to be supplied to the monitor 2. When the later-described AV-IC 15 reads data in the frame buffer 34a at a predetermined cycle (e.g., a cycle of 1/60 sec), a three-dimensional game image is displayed on the screen of the monitor 2.

Further, the Z buffer 34b has a storage capacity corresponding to (the number of pixels (storage locations or addresses) corresponding to the frame buffer 34a)×(the bit count of depth data per pixel), and stores depth information or depth data (Z value) of a dot corresponding to each storage location in the frame buffer 34a.

The DSP 33 acts as an audio processor, and generates audio data by using sound data and sound waveform (tone) data stored in the internal main memory 35 and in the external main memory 12.

Further, similarly to the external main memory 12, the internal main memory 35 stores programs and various data and is also used as a work area or buffer area of the CPU 10.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O processor) 31 performs, for example, data transmission/reception to/from components connected thereto, and data downloading from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to detect presence or absence of data that is required to be transmitted to the network. If such data is present, the input/output processor 31 transmits the data to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. The CPU 10 is able to read and use the data stored in the flash memory 17. In addition to the data transmitted and received between the game apparatus body 4 and other game apparatuses or various servers, the flash memory 17 may store saved data of a game that is played using the game apparatus body 4 (such as result data or progress data of the game).

Further, the input/output processor 31 receives, via the antenna 23 and the wireless controller module 19, operation data or the like transmitted from the controller 7, and stores (temporarily) the operation data or the like in a buffer area of the internal main memory 35 or of the external main memory 12.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communication with the network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data in or from the external storage medium.

On the game apparatus body 4 (e.g., on a front main surface thereof), a power button 24 of the game apparatus body 4, a reset button 25 for resetting game processing, an insertion slot for mounting the optical disc in a detachable manner, an eject button 26 for ejecting the optical disc from the insertion slot of the game apparatus body 4, and the like are provided. The power button 24 and the reset button 25 are connected to the system LSI 11. When the power button 24 is turned on, power is supplied via an AC adaptor (not shown) to each component of the game apparatus body 4. When the reset button 25 is pressed down, the system LSI 11 reboots the boot program of the game apparatus body 4. The eject button 26 is connected to the disc drive 14. When the eject button 26 is pressed down, the optical disc is ejected from the disc drive 14.

(Exemplary Processing of Image Producing Apparatus)

Next, the summary of processing based on an image producing program, executed by the game apparatus 3 which is the image producing apparatus of the exemplary embodiment, will be described. In the exemplary embodiment, the CPU 10 executes processes described below (particularly, all steps in later-described flowcharts in FIG. 7 and subsequent drawings). However, instead of the CPU 10, a processor or a dedicated circuit may execute any step of the processes.

In the present embodiment, the technology disclosed herein provides the game apparatus 3 as an example of an image producing apparatus capable of displaying an image of a virtual space on the display apparatus for planar view, and meanwhile outputting a screenshot of the virtual space in a predetermined format in a stereoscopically visible manner. Here, a screenshot according to the present embodiment is an image corresponding to the image of the virtual space displayed on the display apparatus for planar view. In particular, the screenshot can be displayed in a stereoscopically visible manner when displayed on the LCD 22 of the game apparatus 5.

Figure 6:
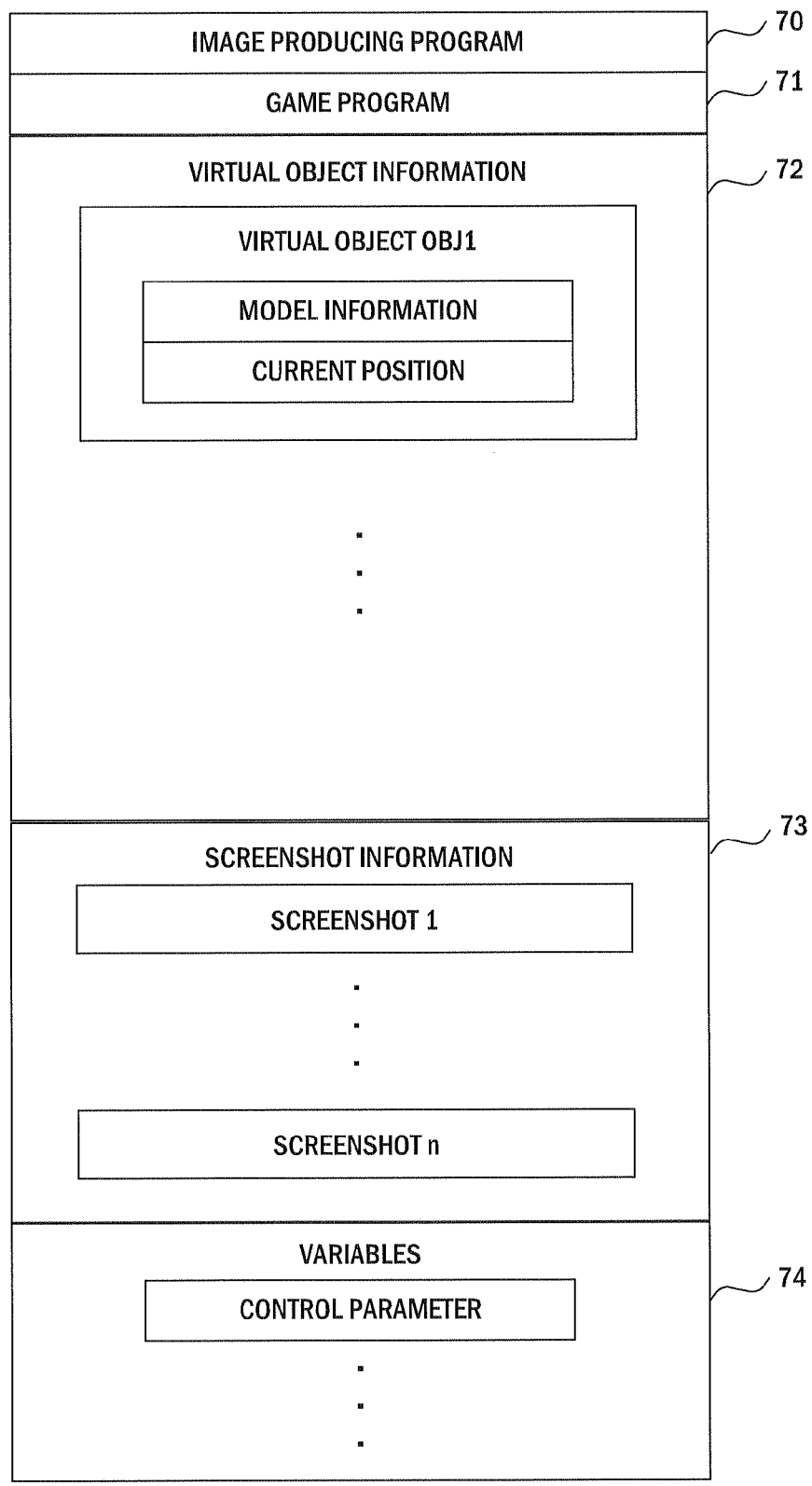
FIG. 6 is a schematic diagram showing an example of a memory map of a main memory 32 of a game apparatus 5.

The game apparatus 3 achieves production of an exemplary screenshot that can be displayed in a stereoscopically visible manner by executing the image producing program 70 (see the description of a "memory map" described later, and FIG. 6). The image producing program 70 is called during execution of game processing based on a game program 71 as an application program, or executed as a program for realizing a part of the function of the game program 71, whereby the image processing of the exemplary embodiment is achieved. It is noted that how the function is divided between the image producing program 70 and the game program 71 may be arbitrarily changed.

In the game processing, the game apparatus 3 can display images obtained by rendering a series of virtual spaces in a planar visible manner, and meanwhile, output the corresponding images (screenshot) in a stereoscopically visible manner. Hereinafter, an example of a process in which the game apparatus 3 renders and displays an image of a virtual space will be described with reference to the drawings appended hereto.

The image producing program 70 (and/or the game program 71) executes processing of sequentially representing a 3-dimensional scene defined by a world coordinate system (i.e., an orthogonal coordinate system that is used for inputting and outputting graphics and does not depend on the apparatus), as a 2-dimensional scene, on the display surface (for example, a display surface 2' of the monitor 2) of the display device. That is, in the processing, a virtual object placed in a world coordinate system is subjected to one or more coordinate transform(s) to a space, i.e., a coordinate system, as necessary. In addition, the image producing program 70 can display a planar view image representing a virtual space on the display surface 2' of the game apparatus 3, and meanwhile, output an image that corresponds to the planar view image and can be displayed in a stereoscopically visible manner on another display apparatus (LCD 22).

The game apparatus 3 according to the exemplary embodiment takes an image of a virtual space in which a virtual object is placed, by using a "virtual stereo camera", from a desired viewpoint, thereby producing a stereoscopically visible image. Here, the virtual stereo camera is composed of a group of virtual cameras (a plurality of viewpoints) positioned in a virtual space so as to provide a group of images in which binocular disparity is reflected. The binocular disparity is a relative displacement between the positions of the same subject on the right and left retinas of an observer. The game apparatus 3 produces a stereoscopic view image (for example, an image for right eye and an image for left eye) that reproduces such displacement between the positions.

First, processing based on an application program for displaying a 3-dimensional scene defined in a world coordinate system as a 2-dimensional scene on the display surface 2', and general processing of outputting the 2-dimensional scene in a stereoscopically visible manner, will be described.

In the information processing by the game apparatus 3, a predetermined virtual object (for example, a virtual object OBJ1) is placed in a world coordinate system in accordance with a request from the application program (for example, the game program 71). If the predetermined object is, for example, a 3-dimensional virtual object, the 3-dimensional virtual object is represented by a model defined in a local coordinate system, and is placed in the world coordinate system, based on the model.

Whether for planar view display or stereoscopic view display, the game apparatus 3 outputs a 3-dimensional scene (3-dimensional virtual space) as a 2-dimensional scene, on the basis of a predetermined viewpoint. In order to produce images in a stereoscopically visible manner, the game apparatus 3 sets at least two viewpoints (virtual cameras). Here, processing of converting a 3-dimensional scene to a 2-dimensional scene is partly similar to processing for planar view display. Therefore, the summary of the procedure for taking an image of a 3-dimensional virtual space from a predetermined viewpoint to obtain a 2-dimensional scene will be described below.

Only a partial space of a 3-dimensional virtual space taken from a viewpoint of an observer (virtual camera) is finally displayed on the display surface 2' of the display device of the game apparatus 3. The virtual camera has a position and a direction in the world coordinate system. The position and the direction characterize an obtained 2-dimensional scene. First, a virtual camera and all models present in a 3-dimensional virtual space, which are represented in the world coordinate system, are subjected to view coordinate transform. The view coordinate transform is transform from the world coordinate system to a predetermined coordinate system in which the virtual camera is positioned at the origin. The space after the transform is referred to as a camera space (camera coordinate system).

In the view coordinate transform, the virtual camera is directed in the positive direction of the z-axis in an xyz coordinate system such that the upper direction of the virtual camera corresponds to the y-axis and the left direction of the virtual camera corresponds to the x-axis, for example. The manner of directing the virtual camera with respect to the three axes may slightly differ depending on the specification of each application program. For example, the virtual camera may be positioned at the origin, and directed in the negative direction of the z-axis such that the upper direction of the virtual camera corresponds to the y-axis and the right direction of the virtual camera corresponds to the x-axis.

Next, so-called vertex shading processing may be performed as necessary. Thereafter, the CPU 10 of the game apparatus 3 performs projection processing (transforms a view volume to a unit cube (canonical view volume)). Normally, perspective projection is used for the projection processing so as to realize the manner (perspective) of visual recognition of an object in a real space.

In perspective projection, the farther from a viewpoint (virtual camera) an object is, the smaller the object is processed to appear after the projection. Geometrically, the view volume in the perspective projection is a frustum.

Figure 3:
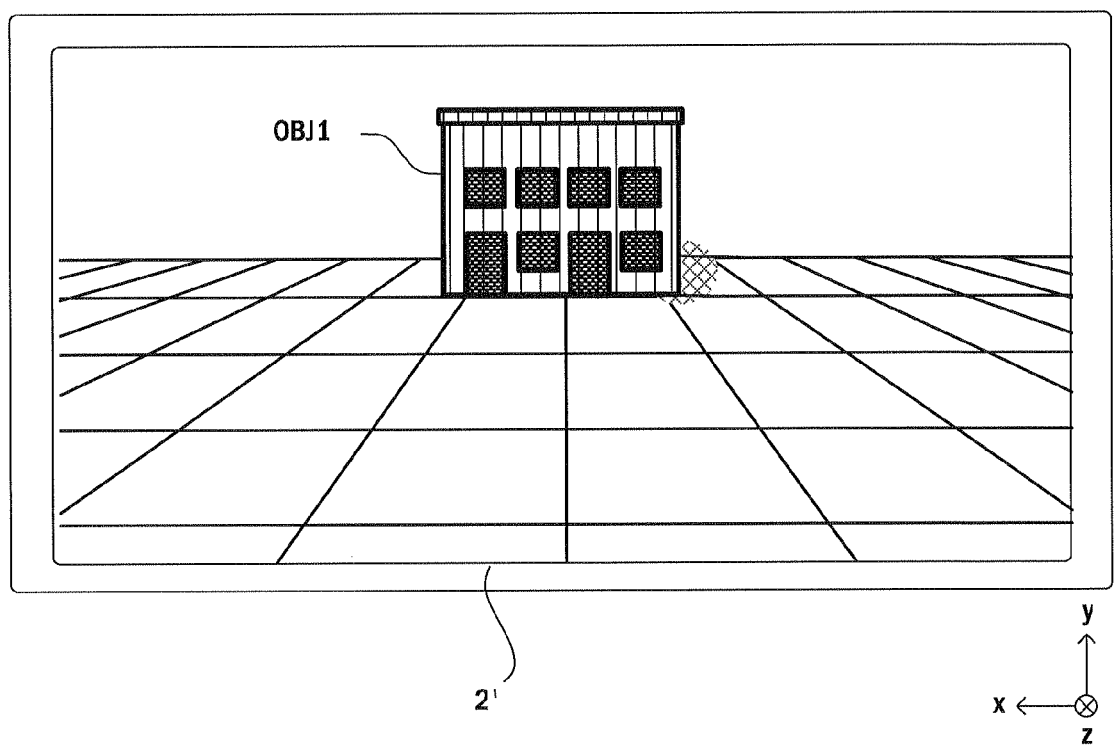
FIG. 3 is a schematic diagram showing an example of an image displayed on a display section 2', the image being obtained by rendering a virtual object on the basis of perspective projection.

An example of an image obtained by using such projection is shown in FIG. 3. FIG. 3 is a schematic diagram showing an example of an image displayed on the display surface 2' that has been obtained by rendering a virtual object based on the perspective projection. Specifically, a 3-dimensional scene in which a virtual object OBJ1 representing a building is placed in a virtual space is displayed on the display surface 2'.

In order to produce a stereoscopically visible image (for example, an image for right eye and an image for left eye), the game apparatus 3 uses a virtual stereo camera (a right virtual camera RC and a left virtual camera LC) for producing such an image.

Figure 4:
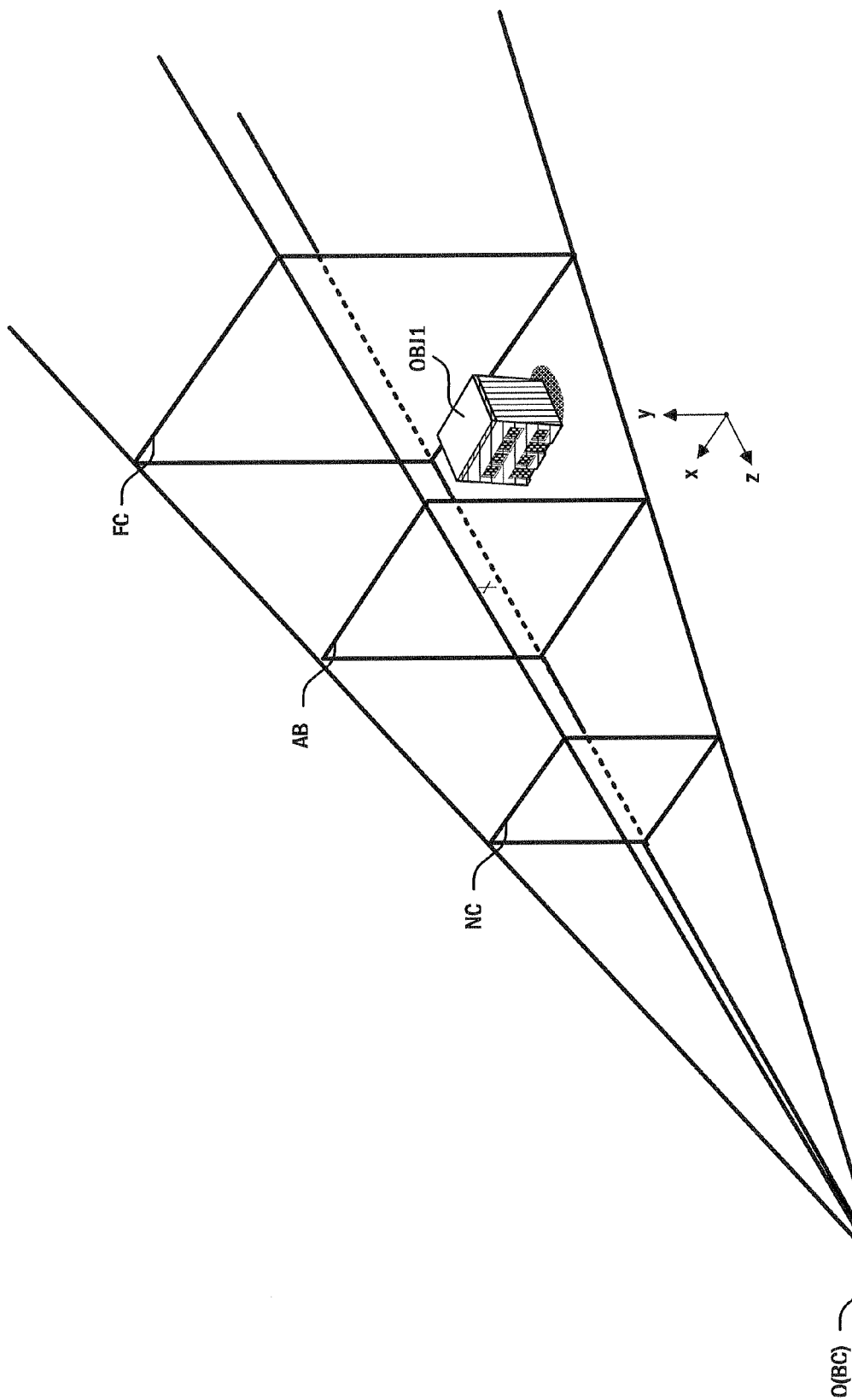
FIG. 4 is an example of a view volume of a reference virtual camera BC used as a reference for defining the setting of a virtual stereo camera.

FIG. 4 exemplifies a view volume of a reference virtual camera BC used as a reference for defining the setting of the virtual stereo camera. FIG. 4 is a schematic diagram showing an example of a view volume assumed for obtaining the image shown in FIG. 3. The schematic diagram exemplifies a view volume defined by a predetermined angle of view, the viewpoint O (for example, the position of the reference virtual camera BC), a far clip plane FC, a near clip plane NC, and a projection plane AB. That is, in the view volume, the position of the reference virtual camera BC is set as the origin. If another viewpoint is defined, a view volume is also defined in accordance therewith. Such a view volume is transformed to a unit cube, whereby an image is obtained in which an object positioned far from the viewpoint is displayed in a smaller manner than the same object positioned near the viewpoint.

In the exemplary embodiment, the midpoint between the positions of the right virtual camera RC and the left virtual camera LC corresponds to the position of the reference virtual camera BC. In addition, in the exemplary embodiment, a line connecting the positions of the right virtual camera RC and the left virtual camera LC is parallel to the projection plane AB.

The right virtual camera RC and the left virtual camera LC form their respective view volumes similar to the view volume of the reference virtual camera BC. These view volumes share the projection plane AB used in the view volume of the reference virtual camera BC. At any rate, stereoscopic view images having binocular disparity therebetween is produced by using the above two view volumes, i.e., by projecting the same object (subject) onto a projection plane by perspective projection based on a plurality of viewpoints (virtual cameras). It is noted that the method for setting a virtual stereo camera (including the case where three or more viewpoints) is not limited to the above example as long as binocular disparity can be reproduced.

After projection processing based on a designated viewpoint, the model placed in the virtual space is positioned at normalized apparatus coordinates. As used herein, the "normalized apparatus coordinates" refer to apparatus coordinates specified by an intermediate coordinate system and normalized within a predetermined range (typically, 0 to 1). A display image represented by the normalized apparatus coordinate system is displayed at the same relative position in any apparatus space. Here, the "apparatus coordinates" are specified by a coordinate system depending on the apparatus. A virtual space including an object defined in the normalized apparatus coordinate system makes it possible to display an image corresponding the virtual space at a predetermined position on the display surface of the display device without depending on the display device.

The virtual object defined in the normalized apparatus coordinate system is subjected to clipping processing as necessary, and then mapped in the apparatus coordinate system (screen coordinate system). Specifically, each object is subjected to translation operation and enlargement/contraction operation so as to match the standard and configuration of the display device (for example, the monitor 2 or the LCD 22), and is defined in the apparatus coordinate system as a 2-dimensional coordinate system defining the display surface (it is noted that, if information about depth direction is added, the value can be held in any storage area in the game apparatus 3). The apparatus coordinate system may be defined, as the display surface, by an xy plane whose origin is set at the center of the display area of the monitor 2 or the LCD 22 and that is parallel to the display surface, for example.

For example, the game apparatus 5 displays, on the LCD 22, an image for right eye and an image for left eye that reflect the virtual camera interval. Owing to the parallax barrier, the image for right eye and the image for left eye are recognized by the right eye and the left eye of a user, respectively, and owing to binocular disparity, the images perceived by the respective eyes cause a stereoscopic effect.

(Description of More Specific Processing)
(Exemplary Configuration of Memory Map)

Hereinafter, main data to be stored in the main memory 32 during execution of a game program will be described. FIG. 6 is a schematic diagram showing the memory map of the main memory 32 of the game apparatus 5. As shown in FIG. 6, the game program 70, the image producing program 71, a virtual object information 72, screenshot information 73, variables 74, and the like are stored in the main memory 32.

The image producing program 70 is a program for realizing the processing of the exemplary embodiment by being called in the game processing based on the game program 71 or by functioning as a part of the game program 71.

The game program 71 is a program for causing the information processing section 31 to execute game display processing.

The virtual object information 72 is information about virtual objects, which includes: model information (for example, information about polygon) representing the shape or the pattern of each virtual object, current position information about each virtual object in a virtual space, and the like.

The screenshot information 73 is still image data corresponding to a screenshot produced as an image that can be displayed in a stereoscopically visible manner on the game apparatus 5.

The variables 74 are used in execution of the game program 70 and the image producing program 71.

(Specific Flow of Processing)

Figure 7:
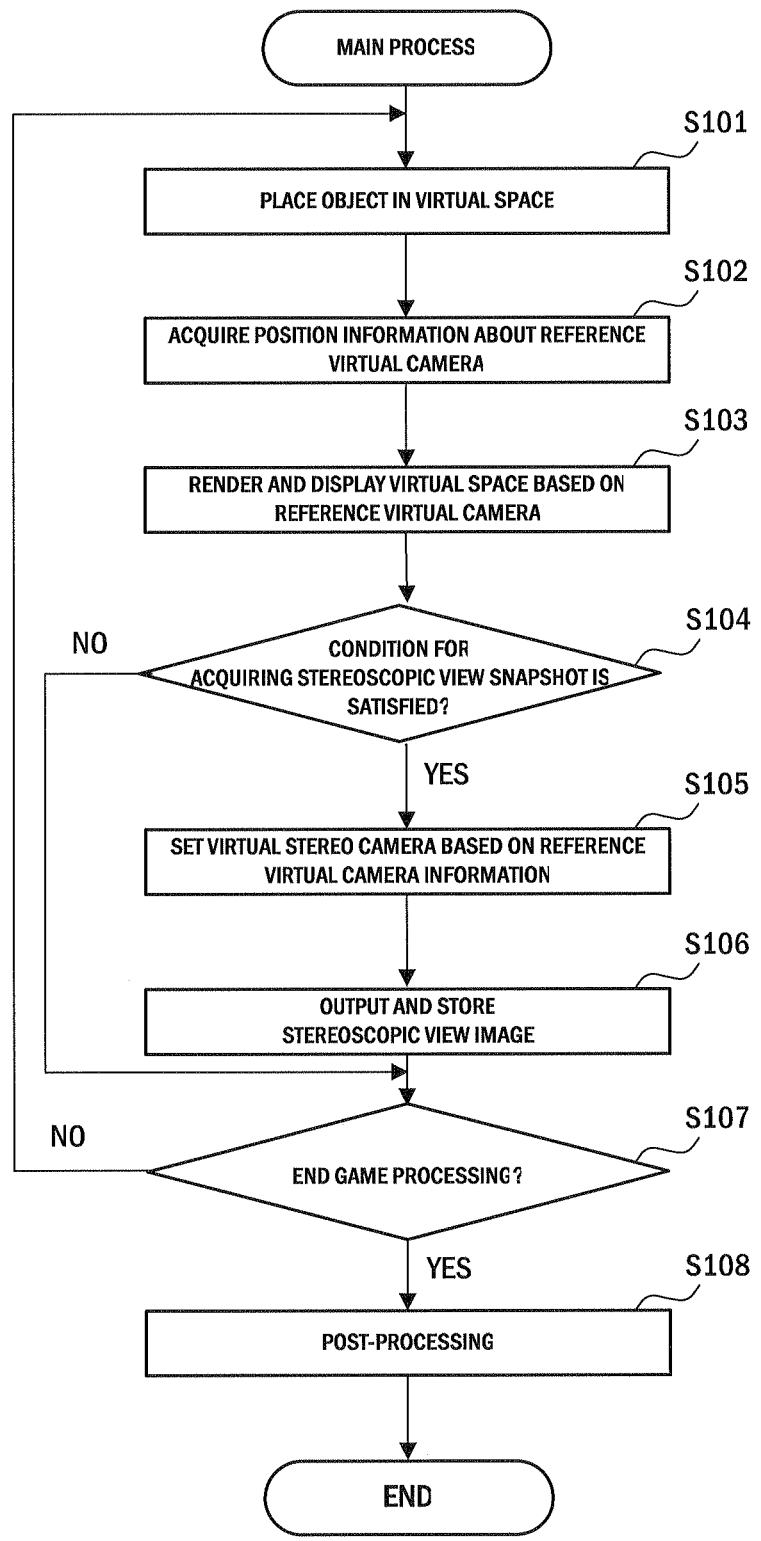
FIG. 7 is a flowchart showing an example of a main process executed on the basis of an image producing program 70 by a game apparatus 3 according to the exemplary embodiment.

With reference to FIG. 7, the above processing will be more specifically described.

FIG. 7 is a flowchart showing an example of a main process executed on the basis of the image producing program 70 by the game apparatus 3 according to the exemplary embodiment.

In step 101, the CPU 10 executes processing of placing an object in a virtual space. Specifically, in information processing executed by the game apparatus 3, a predetermined object (for example, the virtual object OBJ1) is placed in a world coordinate system in accordance with a request by an application program (for example, the game program 71).

In step 102, the CPU 10 executes processing of acquiring position information about the reference virtual camera BC. Specifically, any position and direction in the world coordinate system are used as the position information about the reference virtual camera BC in accordance with the information processing executed by the game apparatus 3.

In step 103, the CPU 10 executes processing of rendering and displaying the virtual space on the basis of the reference virtual camera BC. Specifically, the CPU 10 performs processing (perspective transformation processing) using perspective projection as described above, on the basis of the position information about the reference virtual camera BC. Then, the CPU 10 displays the obtained image on the display surface 2' at a predetermined timing.

In step 104, the CPU 10 determines whether or not a condition is satisfied for acquiring a snapshot for stereoscopic view. The condition for acquiring a snapshot for stereoscopic view is a condition for determining whether or not to produce an image for stereoscopic view in the subsequent steps 105 and 106.

Specifically, the condition can be set as a condition related to a state during a progress of the game processing based on the game program 71, e.g., a condition that the internal state during the game processing is within a stage of the executed game application. Alternatively, the condition may be that related to user's operation, for example, a detection of a user's operation performed, e.g., via the controller 7 on the game apparatus 3. It is noted that the processing of determining whether or not the condition for acquiring a snapshot for stereoscopic view may be performed before one of the above steps 101 to 103.

In step 104, if the CPU 10 has determined that the condition for acquiring a snapshot for stereoscopic view is satisfied (YES in step 104), the CPU 10 performs processing of step 105 and the subsequent steps. On the other hand, if the CPU 10 has determined that the condition for acquiring a snapshot for stereoscopic view is not satisfied (NO in step 104), the CPU 10 skips processing of steps 105 and 106 to perform processing of step 107.

Steps 105 and 106 are a series of steps for producing an image for stereoscopic view.

In step 105, the CPU 10 executes processing of setting a virtual stereo camera on the basis of information about the reference virtual camera BC.

In step 106, the CPU 10 executes processing of outputting and storing the stereoscopic view image.

The specific procedure in steps 105 and 106 is generally as follows.

The game apparatus 3 sets a virtual stereo camera (the right virtual camera RC for right eye and the left virtual camera LC for left eye) for providing an image group in a stereoscopically visible manner.

Specifically, the position and the like of the virtual stereo camera are calculated by the following method, for example. In order to explain the calculation method, an exemplary method for calculating the displacement of a projected image (corresponding point) of an object between an image for right eye and an image for left eye, which displacement is to be set for an object at any point, will be described with reference to FIG. 5.

Figure 5:
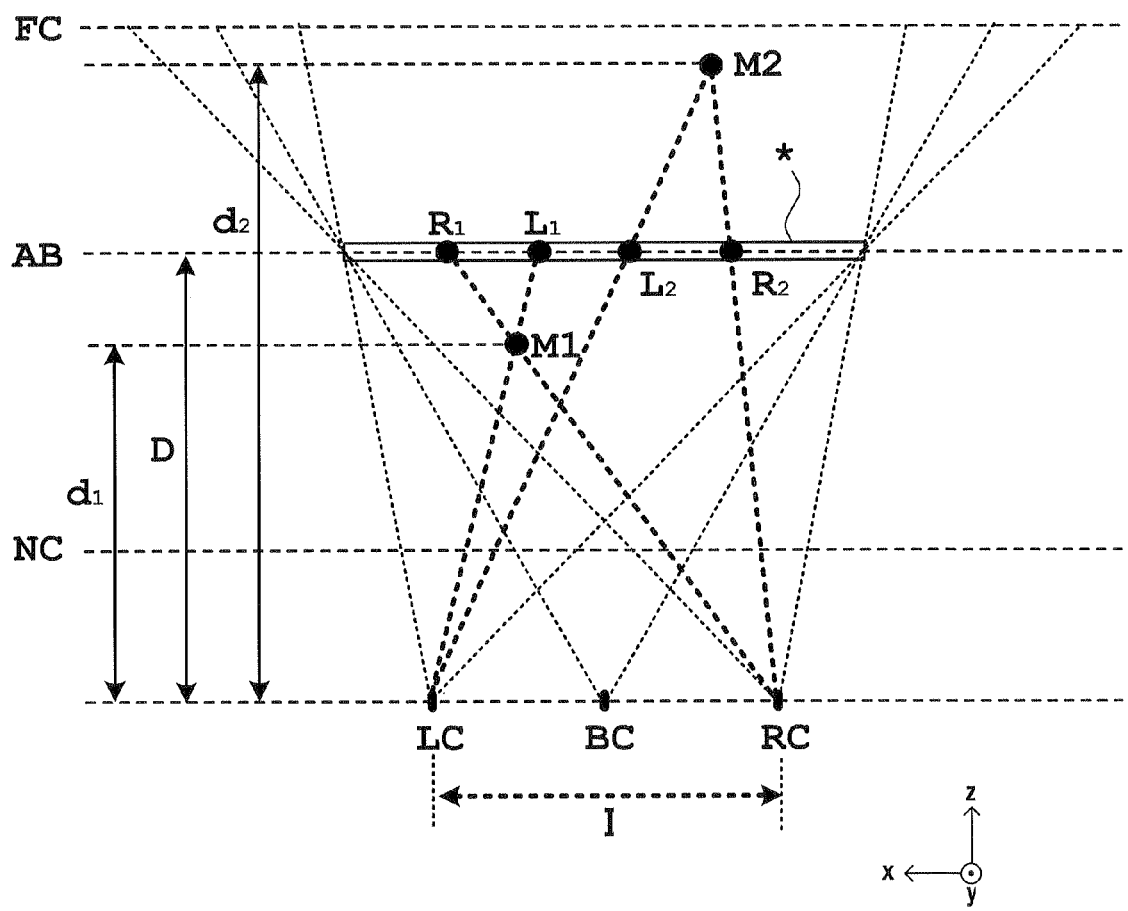
FIG. 5 is an exemplary schematic diagram showing view volumes of a right virtual camera RC and a left virtual camera LC, and the view volume of the reference virtual camera BC used as a reference for calculating the positions of those virtual cameras.

FIG. 5 is a schematic diagram showing view volumes of the right virtual camera RC and the left virtual camera LC, and a view volume of the reference virtual camera BC which is a reference for calculating the positions of those virtual cameras. Each view volume is sandwiched between the far clip plane FC and the near clip plane NC parallel to the far clip plane FC. The projection plane (indicated by mark * in the drawing) is present at the position of the reference plane AB which is parallel to both clip planes.

First, regarding a representative point M1 of a virtual object positioned nearer each virtual camera than the reference plane, the displacement in the horizontal direction (x-axis direction) to be caused between the images projected on an image for right eye and an image for left eye so as to provide a stereoscopic view will be described.

The following model will be assumed in order to calculate the condition for displaying the representative point M1 of the virtual object on the display surface of the game apparatus 5 so as to provide a feeling (a kind of depth feeling) of the representative point M1 being present in front of the projection plane which is present at a position corresponds to the display surface (LCD 22) of the game apparatus 5 which has a stereoscopic display function.

In order to display the image of the representative point M1 separated from each virtual camera by a distance $d_1$ so as to appear in front of the projection plane, the image of the representative point M1 is rendered, on each of an image for right eye and an image for left eye, at a position corresponding to the intersection of the reference plane with a line connecting each virtual camera (right virtual camera and left virtual camera) and the representative point M1 (here, the intersection for right virtual camera is $R_1$, and the intersection for right virtual camera is $L_1$).

That is, the images projected on the image for right eye and the image for left eye are rendered at a position displaced leftward on the image for right eye and a position displaced rightward on the image for left eye, respectively, from a base point which is the position of the image projected based on the reference virtual camera BC. Then, it is understood that the displacement in the horizontal direction caused between the images projected on the image for right eye and the image for left eye is to be a length $R_1L_1$.

The length $R_1L_1$ is represented as follows, using a given virtual camera interval I and a distance D to the virtual camera.

$$R_1L_1 = I*(D-d_1)/d_1 \qquad \text{Expression (1)}$$

Where $D \geq d_1$.

Similarly, regarding a representative point M2 of a virtual object positioned in back of the reference plane (LCD 22) (i.e., positioned farther from the viewpoint than the reference plane) and separated from the reference plane by a distance $d_2$, a length $R_2L_2$ which is the displacement of the representative point M2 is expressed by the following expression.

$$R_2L_2 = I*(d_1-D)/d_2 \qquad \text{Expression (2)}$$

Where $D < d_2$.

Hereinafter, the displacements obtained in accordance with the calculation of the lengths $R_1L_1$ and the $R_2L_2$ are collectively referred to as ΔX'. In this case, the images projected on the image for right eye and the image for left eye are rendered at a position displaced rightward on the image for right eye and a position displaced leftward on the image for left eye, respectively, from the base point which is the position of the image projected based on the reference virtual camera BC.

The CPU 10 stores the obtained stereoscopic view image (the image for right eye and the image for left eye) in a predetermined storage area (for example, the main memory 32, the internal main memory 35, or the external main memory 12) of the game apparatus 3. The storage area may be volatile or nonvolatile. For example, as shown in FIG. 6, an area for the screenshot information 73 is provided in the main memory 32. The CPU 10 stores the stereoscopic view images in that area.

In step 107, the CPU 10 determines whether or not to end the game processing. Specifically, if the CPU 10 has determined that a condition for ending the game is satisfied (for example, a predetermined operation by a user has been detected or the game processing has reached a predetermined stage) (YES in step 107), the process proceeds to step 108. On the other hand, the CPU 10 has determined that the condition for ending the game is not satisfied, the process returns to the above step 101.

In step 108, the CPU 10 executes post-processing. Specifically, the CPU 10 performs processing of transferring the stereoscopic view images stored in the above storage area to another predetermined area or transferring the stereoscopic view images to another apparatus (for example, the game apparatus 5) by means of wireless function, as necessary. For example, the CPU 10 may store the stereoscopic view images in a detachable storage medium. If the storage area storing the data is volatile, the data may be transferred to a nonvolatile storage area as necessary.

The stereoscopic view image produced as described above can be reproduced in a stereoscopically visible manner in a system that includes a stereoscopic display apparatus in accordance with any method.

Examples of a system having such a stereoscopic display apparatus include the game apparatus 5 shown in an area enclosed by a dotted line in FIG. 1, but are not limited thereto. The game apparatus 5 includes the LCD 22 as a stereoscopic display apparatus. The number of pixels of the LCD 22 may be, for example, 800 dots×240 dots (the horizontal line×the vertical line). Although, in the present embodiment, the LCD 22 is an LCD, a display device using an EL (Electro Luminescence), or the like may be used. In addition, a display device having any resolution may be used as the LCD 22.

The LCD 22 of the game apparatus 5 is a display device capable of displaying a stereoscopically visible image. Further, in the present embodiment, an image for left eye and an image for right eye are displayed by using substantially the same display area. Specifically, the LCD 22 may be a display device using a method in which the image for left eye and the image for right eye are alternately displayed in the horizontal direction in predetermined units (for example, every other line). Alternatively, a display device using a method in which the image for left eye and the image for right eye are alternately displayed for a predetermined time period may be used. Further, in the present embodiment, the LCD 22 is a display device capable of displaying an image which is stereoscopically visible with naked eyes. A lenticular lens type display device or a parallax barrier type display device is used which enables the image for left eye and the image for right eye, which are alternately displayed in the horizontal direction, to be separately viewed by the left eye and the right eye, respectively. In the present embodiment, the LCD 22 of a parallax barrier type is used. The LCD 22 displays, by using the image for right eye and the image for left eye, an image (a stereoscopic image) which is stereoscopically visible with naked eyes. That is, the LCD 22 allows a user to view the image for left eye with her/his left eye, and the image for right eye with her/his right eye by utilizing a parallax barrier, so that a stereoscopic image (a stereoscopically visible image) exerting a stereoscopic effect for a user can be displayed. Further, the LCD 22 may disable the parallax barrier. When the parallax barrier is disabled, an image can be displayed in a planar manner (it is possible to display a planar view image which is different from a stereoscopically visible image as described above. Specifically, a display mode is used in which the same displayed image is viewed with a left eye and a right eye.). Thus, the LCD 22 is a display device capable of switching between a stereoscopic display mode for displaying a stereoscopically visible image and a planar display mode (for displaying a planar view image) for displaying an image in a planar manner. The switching of the display mode is performed by the 3D adjustment switch 25 described later. Specifically, the relative position of the slider 25a with respect to the 3D adjustment switch 25 is associated with stepwise switching between the planar display mode and the stereoscopic display mode.

(Other Respects)

In the embodiment described above, a stereoscopic view image that can be reproduced on a display using a general parallax barrier method is produced as a method of reproducing a binocular disparity. However, a method of performing stereoscopic display is not limited to the parallax barrier method. For example, as a method of performing stereoscopic display, a so-called integral method may be used. In other words, as a method of reproducing a binocular disparity, an image in which a disparity is reflected may be displayed by using a principle of reproducing, on a display device, light reflected by an object. In a general liquid crystal display, three sub-pixels of RGB constitute one pixel. However, the integral method uses another configuration. For example, one pixel in video display is constituted of 27 sub-pixels. Then, the display device emits nine video images in which disparity information is reflected, as light having a plurality of directions (nine directions in the above example) by using a specially-shaped lens. Thus, the pixel group viewed through the above lens projects video images that are slightly differently viewed by right and left eyes, whereby a binocular disparity can occur.

In the exemplary embodiment described above, the image producing program 70 is used with the game apparatus 3. However, in another embodiment, the image producing program disclosed herein may be used with any information processing apparatus or any information processing system (e.g., a PDA (Personal Digital Assistant), a mobile phone, a personal computer, or a camera).

In addition, in the exemplary embodiment described above, the image producing program is executed in game processing by using only one apparatus (game apparatus 3). However, in another embodiment, a plurality of information processing apparatuses, included in an image display system, that can communicate with each other may share the execution of the image producing program.

Note that in the case where the image producing program and the like disclosed herein are used on a general-purpose platform, the image producing program may be provided under the condition that a standard program module provided on the platform is used. It should be understood that even if a function corresponding to such a module as described above is excluded from the image producing program, the resultant image producing program substantially corresponds to the original image producing program as long as the module complements the excluded function.

While the exemplary matter disclosed herein has been described in detail, the foregoing description is in all aspects illustrative and not restrictive. It is understood that numerous other modifications and variations can be devised without departing from the scope of the matter disclosed herein. It is understood that, from the description of specific exemplary embodiments of the matter disclosed herein, a person skilled in the art can easily implement the exemplary embodiments in the equivalent range based on the description of the exemplary embodiments and on the common technological knowledge. Further, it should be understood that terms used in the present specification have meanings generally used in the art concerned unless otherwise specified. Therefore, unless otherwise defined, all the jargon and technical terms have the same meanings as those generally understood by a person skilled in the art. In the event of any conflict, the present specification (including meanings defined herein) has priority.

What is claimed is:

1. A non-transitory computer-readable storage medium having stored thereon an image producing program which, when executed by a computer of an image producing apparatus which produces an image to be displayed on a display for fully planar view, causes the computer to control the image producing apparatus to at least:
   produce a planar view image by taking an image of a virtual space with a reference virtual camera for providing planar view of the virtual space, the planar view image being an image that is not based on stereoscopic view;
   display the planar view image on the display;
   while the planar view image is displayed on the display, set a stereoscopic view virtual camera on the basis of a setting of the reference virtual camera and take an image of the virtual space with the stereoscopic view virtual camera, thereby producing a stereoscopic view image that includes an image for right eye and an image for left eye which are obtained based on at least two viewpoints; and
   store the stereoscopic view image in storage without outputting the stereoscopic view image to the display.

2. The non-transitory computer-readable storage medium according to claim 1, wherein
   the stereoscopic view image is stored in the storage while the planar view image is displayed on the display.

3. The non-transitory computer-readable storage medium according to claim 2, wherein
   the stereoscopic view image is produced such that the image of the virtual space taken with the stereoscopic view virtual camera includes a predetermined area of the image of the virtual space taken by the reference virtual camera.

4. The non-transitory computer-readable storage medium according to claim 3, wherein the image producing program, when executed, further causes the computer to control the image producing apparatus to:
   set a right virtual camera and a left virtual camera as the stereoscopic view virtual camera for producing the image for right eye and the image for left eye, such that a view volume of the left virtual camera and a view volume of the right virtual camera each include a predetermined area in a view volume of the reference virtual camera, and
   take an image of the virtual space with the set left virtual camera and the set right virtual camera, thereby producing the image for right eye and the image for left eye.

5. The non-transitory computer-readable storage medium according to claim 1, wherein the image producing program, when executed, further causes the computer to control the image producing apparatus to:
   set a right virtual camera and a left virtual camera as the stereoscopic view virtual camera for producing the image for right eye and the image for left eye, such that the left virtual camera and the right virtual camera are each directed in the same visual line direction as the reference virtual camera, and translated, on a virtual plane containing the visual line, so as to have a positional relationship in which the reference virtual camera is positioned between the left virtual camera and the right virtual camera, and
   take an image of the virtual space with the set left virtual camera and the set right virtual camera, thereby producing the image for right eye and the image for left eye.

6. The non-transitory computer-readable storage medium according to claim 1, wherein the image producing program, when executed, further causes the computer to control the image producing apparatus to:

set a right virtual camera and a left virtual camera as the stereoscopic view virtual camera for producing the image for right eye and the image for left eye, such that the interval between the left virtual camera and the right virtual camera is adjusted in accordance with the position, in the imaging direction of the reference virtual camera, of a predetermined object included in the imaging range of the reference virtual camera, and take an image of the virtual space with the set left virtual camera and the set right virtual camera, thereby producing the image for right eye and the image for left eye.

7. The non-transitory computer-readable storage medium according to claim 6, wherein the image producing program, when executed, further causes the computer to control the image producing apparatus to:

set the stereoscopic view virtual camera such that the farther the predetermined object is from the stereoscopic view virtual camera, the smaller the interval between the left virtual camera and the right virtual camera.

8. The non-transitory computer-readable storage medium according to claim 1, wherein the image producing program, when executed, further causes the computer to control the image producing apparatus to:

detect a user's predetermined operation, and produce the stereoscopic view image in accordance with the detection of the user's predetermined operation.

9. The non-transitory computer-readable storage medium according to claim 1, wherein the image producing program, when executed, further causes the computer to control the image producing apparatus to:

determine whether or not a setting used to produce the planar view image satisfies a predetermined condition, and automatically produce the stereoscopic view image if the setting is determined to satisfy the predetermined condition.

10. The non-transitory computer-readable storage medium according to claim 1, wherein the storage is detachable from the image producing apparatus.

11. The non-transitory computer-readable storage medium according to claim 1, wherein the storage is a volatile storage medium included in or connected to the image producing apparatus.

12. An image producing apparatus which produces an image to be displayed on a display for fully planar view, the image producing apparatus comprising electronic circuitry configured to control the image producing apparatus to at least:

produce a planar view image by taking an image of a virtual space with a reference virtual camera for providing planar view of the virtual space, the planar view image being an image that is not based on stereoscopic view;

display the planar view image on the display;

while the planar view image is displayed on the display, set a stereoscopic view virtual camera on the basis of a setting of the reference virtual camera and take an image of the virtual space with the stereoscopic view virtual camera, thereby producing a stereoscopic view image that includes an image for right eye and an image for left eye which are obtained based on at least two viewpoints; and store the stereoscopic view image in storage without outputting the stereoscopic view image to the display.

13. The image processing apparatus according to claim 12, wherein the electronic circuitry comprises a central processing unit.

14. The image processing apparatus according to claim 12, wherein the electronic circuitry comprises a processor.

15. The image processing apparatus according to claim 12, wherein the electronic circuitry comprises a dedicated circuit.

16. An image producing system comprising:

a display for providing a fully planar view; and processing circuitry for at least:

producing a planar view image by taking an image of a virtual space with a reference virtual camera for providing planar view of the virtual space, the planar view image being an image that is not based on stereoscopic view;

controlling display of the planar view image on the display;

setting, while the planar view image is displayed on the display, a stereoscopic view virtual camera on the basis of a setting of the reference virtual camera and taking an image of the virtual space with the stereoscopic view virtual camera, thereby producing a stereoscopic view image that includes an image for right eye and an image for left eye which are obtained based on at least two viewpoints; and storing the stereoscopic view image in storage without outputting the stereoscopic view image to the display.

17. An image producing method for producing an image to be displayed on a display for fully planar view, the image producing method comprising:

producing a planar view image by taking an image of a virtual space with a reference virtual camera for providing planar view of the virtual space, the planar view image being an image that is not based on stereoscopic view;

displaying the planar view image on the display;

while the planar view image is displayed on the display, setting a stereoscopic view virtual camera on the basis of a setting of the reference virtual camera and taking an image of the virtual space with the stereoscopic view virtual camera, thereby producing a stereoscopic view image that includes an image for right eye and an image for left eye which are obtained based on at least two viewpoints; and storing the stereoscopic view image in storage without outputting the stereoscopic view image to the display.

18. The apparatus according to claim 12, embodied in a mobile phone.

19. A system comprising:

a memory; and a processing system comprising a hardware processor, the processing system configured to control a display to display, on a planar view display for fully planar view, a planar view image of a virtual space based on a planar view image of a reference virtual camera, the planar view image being an image that is not based on stereoscopic view; while the planar view image is displayed on the planar view display, set a stereoscopic view virtual camera based on a setting of the reference virtual camera; take an image of the virtual space with the stereoscopic view virtual camera, thereby producing a stereoscopic view image that includes a right eye image and a left image which are obtained based on at least two viewpoints; and store the stereoscopic view image in storage.

* * * * *